United States Patent
Piepenbrink et al.

(10) Patent No.: US 8,677,463 B2
(45) Date of Patent: Mar. 18, 2014

(54) SYSTEM AND METHOD FOR MANAGING MULTIPLE SUB ACCOUNTS WITHIN A SUBCRIBER MAIN ACCOUNT IN A DATA DISTRIBUTION SYSTEM

(75) Inventors: David Piepenbrink, Chicago, IL (US); James Y. Sofos, Aurora, IL (US); Lee M. Chow, Naperville, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 947 days.

(21) Appl. No.: 12/329,490

(22) Filed: Dec. 5, 2008

(65) Prior Publication Data

US 2010/0146607 A1    Jun. 10, 2010

(51) Int. Cl.
*G06F 7/04* (2006.01)
*H04N 7/16* (2011.01)
*G06F 15/16* (2006.01)

(52) U.S. Cl.
USPC ............ 726/6; 726/7; 725/9; 725/28; 725/30; 709/228

(58) Field of Classification Search
USPC .................... 726/6, 7; 725/9, 28, 30; 709/228
See application file for complete search history.

(56) References Cited

U.S. PATENT DOCUMENTS

| | | | |
|---|---|---|---|
| 6,163,272 A * | 12/2000 | Goode et al. ................... 725/30 |
| 6,317,718 B1 | 11/2001 | Fano |
| 6,718,551 B1 * | 4/2004 | Swix et al. ...................... 725/32 |
| 6,909,837 B1 | 6/2005 | Unger |
| 6,944,585 B1 * | 9/2005 | Pawson ........................... 703/22 |
| 6,993,325 B1 | 1/2006 | Link, II et al. |
| 7,206,754 B1 | 4/2007 | Spector |
| 7,822,654 B2 * | 10/2010 | Block et al. ..................... 705/33 |
| 2001/0047294 A1 | 11/2001 | Rothschild |
| 2002/0032904 A1 | 3/2002 | Lerner |
| 2002/0069407 A1 | 6/2002 | Fagnani |
| 2002/0083006 A1 * | 6/2002 | Headings et al. ............... 705/59 |
| 2002/0087969 A1 | 7/2002 | Brunheroto |
| 2003/0083937 A1 | 5/2003 | Hasegawa |

(Continued)

FOREIGN PATENT DOCUMENTS

EP    1 339 229 A2    8/2003

OTHER PUBLICATIONS

Kazienko,P.; Multi-Agent System for Web Advertising, Lecture Notes in Computer Science, 2005, pp. 507-513, Springer-Verlag, German.

(Continued)

*Primary Examiner* — Teshome Hailu
(74) *Attorney, Agent, or Firm* — Michael Roebuck, PC

(57) ABSTRACT

A computer readable storage medium is disclosed having a computer program stored therein, which in a particular embodiment, the computer program includes but is not limited to machine readable instructions that when executed by a computer manage a plurality of sub accounts under a main account in a data distribution system, the computer program including but not limited to instructions to assign the plurality of sub accounts under the main account in a main account data structure at a server in the data distribution system; instructions to assign a plurality of end user devices to each one of the plurality of sub accounts; and instructions to receive end user device attribute data from at least one of the end user devices to the main account data structure after the attribute data is created at the at least one end user device.

12 Claims, 4 Drawing Sheets

(56) References Cited

U.S. PATENT DOCUMENTS

| | | |
|---|---|---|
| 2004/0073915 A1 | 4/2004 | Dureau |
| 2004/0107137 A1 | 6/2004 | Skinner |
| 2004/0117254 A1 | 6/2004 | Nemirofsky |
| 2004/0158528 A1 | 8/2004 | Zuili |
| 2005/0080665 A1 | 4/2005 | Bowman |
| 2005/0278731 A1 | 12/2005 | Cameron |
| 2006/0004632 A1 | 1/2006 | Kelsen |
| 2006/0026067 A1 | 2/2006 | Nicholas et al. |
| 2006/0080239 A1 | 4/2006 | Harlog |
| 2006/0195866 A1 | 8/2006 | Thukral |
| 2006/0253323 A1 | 11/2006 | Phan |
| 2006/0256133 A1 | 11/2006 | Rosenberg |
| 2007/0074258 A1* | 3/2007 | Wood et al. ............... 725/105 |
| 2007/0079706 A1 | 4/2007 | Datta |
| 2007/0150606 A1* | 6/2007 | Flinchem et al. .......... 709/228 |
| 2007/0157228 A1 | 7/2007 | Bayer |
| 2009/0293078 A1* | 11/2009 | Pirani et al. ................. 725/9 |
| 2010/0318466 A1* | 12/2010 | Flinchem et al. ........... 705/50 |
| 2011/0131600 A1* | 6/2011 | Howcroft et al. ............ 725/28 |

OTHER PUBLICATIONS

Wales et al.; IPTV—The Revolution is Here; Dec. 7, 2005, pp. 1-19.

\* cited by examiner

SYSTEM AND METHOD FOR MANAGING MULTIPLE SUB ACCOUNTS WITHIN A SUBCRIBER MAIN ACCOUNT IN A DATA DISTRIBUTION SYSTEM

BACKGROUND

1. Field of Disclosure

The disclosure relates to the field of video data distribution systems and more specifically to systems and methods for managing sub accounts under a main account in a data distribution system.

2. Description of Related Art

Targeted advertising selects an advertisement and sends the advertisement to selected individuals who are targeted to receive the advertisement. Advertisers can potentially save advertising dollars by selecting who will receive their advertisements rather than indiscriminately broadcasting their advertisements to a general population of recipients. Thus, only those individuals selected by an advertiser receive the targeted advertisement in hope that the targeted recipients will be more responsive on a per capita basis than a general broadcast population. Advertisement distributors and providers that enable such an advertising model (e.g. Internet portals, television providers, access network providers) can correspondingly increase their revenue per advertisement impression by providing targeted advertising options for advertisers.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

DETAILED DESCRIPTION OF THE DISCLOSURE

Figure 1:
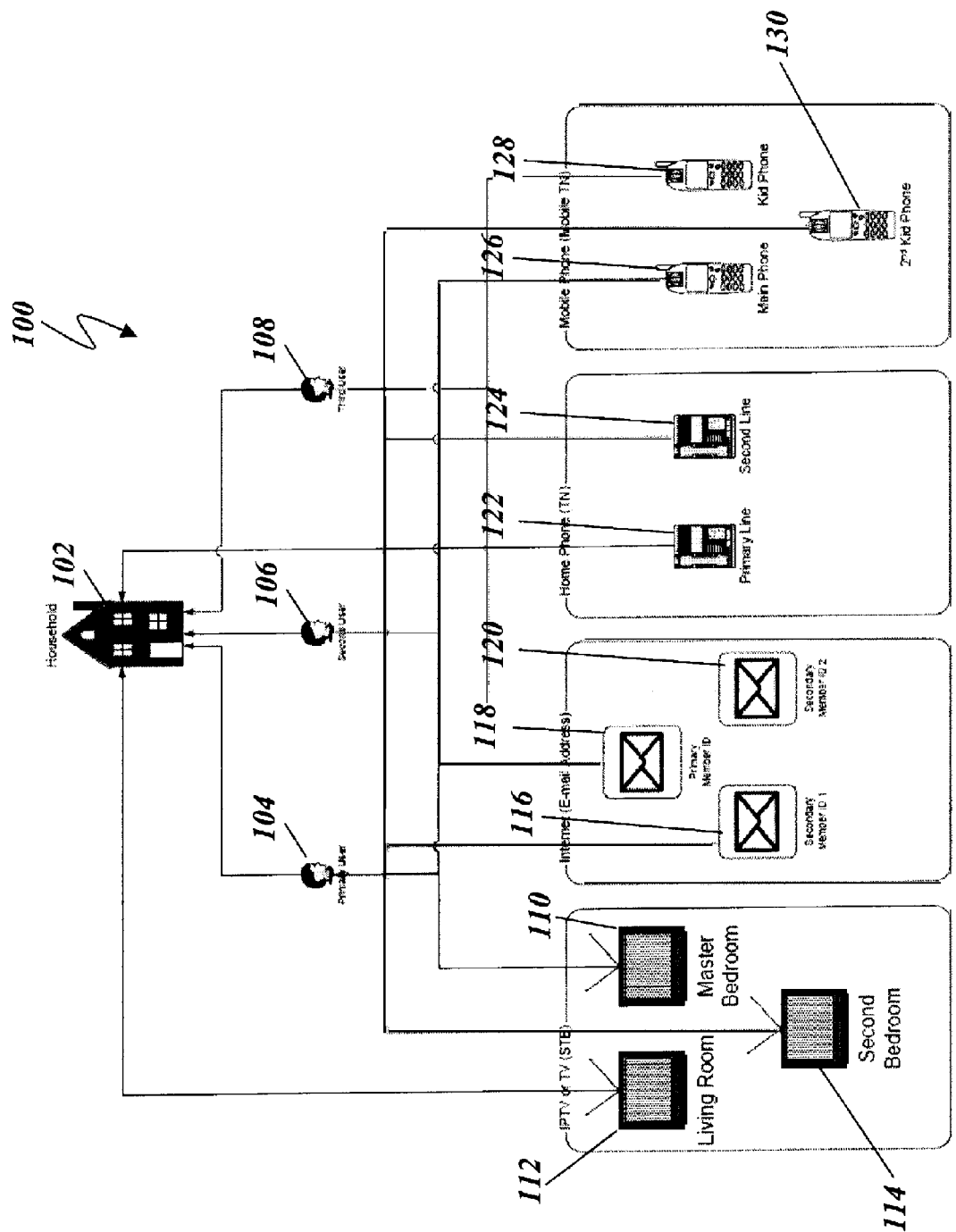
FIG. 1 is a schematic diagram of a subscriber household containing multiple end user devices attributable to a main account and sub accounts in an illustrative embodiment.

In the following description, for purposes of explanation, numerous specific details are set forth in order to provide a thorough understanding of particular illustrative embodiments of the present invention. It will be evident, however, to one skilled in the art that the present invention may be practiced without these specific details.

Given the privacy concerns of subscribers, an illustrative embodiment of a system and method provides subscriber directed privacy controls that include utilizing subscriber usage information as opt in settings defined by the subscriber or end user, and maintained in the end user's profile. The subscriber privacy controls are further supplemented with merchant and service provider privacy controls that may be used to restrict access to monitoring subscriber related data including but not limited to subscriber identity and subscriber activity such as phone logs and web surfing history. In another embodiment the subscriber has strict control over how his personal web surfing, communications, and purchase information can be used in identifiable and non-identifiable ways (i.e., relate data collected anonymously or to a specific user), both in maintaining the product interest score system, and in determining what can be acceptably advertised to the subscriber.

In an IP-based targeted advertising system, the subscriber has full control over which of her tasks are tracked and how they are tracked (e.g., by identifying the user, generically flagging the data, for the purposes of maintaining product correlation interests, as well as what types of ads can be delivered and under what circumstances the subscriber is willing to receive them. Regardless, none of the subscriber's personal usage information needs to be disclosed to potential advertisers. Rather, advertisers can use only the product interest scores, subscriber permissions defining under what circumstances they are willing to receive an advertisement, and the current context of the user (all with subscriber opt in) to determine whether delivering an advertisement to the subscriber at an agreed upon time and price is appropriate.

In a particular embodiment an end user device is selected from a group including but not limited to a cell phone, personal digital assistant (PDA), lap top computer, stationary personal computer, IPTV remote control, web tablet, laptop computer, pocket PC, a television set capable of receiving IP based video services and mobile IP device, the second subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, and the third subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device.

As entertainment companies are moving toward quad-play services more and more customers have multiple avenues to consume content (i.e. internet protocol television (IPTV), Web sites, Mobile Phone, personal media players (PMPs), etc.) Customers typically can not conveniently associate their entertainment consumption devices together into a single user entity. In the market today personalization is generally accomplished at a main account level, such as main account for a single household. This approach is flawed because one account may have many different personas or end users under the single main account that have drastically different taste in content. By combining all of end users into one account the personalization is often going to be not correct for a particular end user. In the past, for example, a family with a mother, a father and two kids typically has a single main account through which multiple services and entertainment content flows. All services and consumption of content from a service provider television, computer web surfing, email activity, landline phone calls would be grouped together under one main account, although the family unit's individual member represent diverse interests and usage.

An illustrative embodiment provides a sub account system and method and that enables a subscriber at a main account to define sub accounts for individual family members and associate end user devices used primarily by individual family members with a sub account and end user devices that are primarily used by an individual family member. This will enable any settings data that are set for a sub account (favorites, parental controls, demographic tastes, etc.) to be maintained consistent for all devices that the sub account owner uses. By doing this a service provider is enabling itself to leverage all end user activity data on those devices associated with a sub account under a main account to build more detailed end user profiles for individual family members and further personalize the experience that a individual family member has directly to their user persona for the sub account, instead of generically to the entire main account. The benefits of this solution is the by combining end user device types, end user activity data and preferences together across different devices associated with a sub account under the main account.

In another illustrative embodiment a computer program product is disclosed, the computer program product including but not limited to a computer readable storage medium, having a computer program stored therein, the computer program comprising machine readable instructions that when executed by a computer manage a plurality of sub accounts under a main account in a data distribution system, the computer program comprising instructions to assign the plurality of sub accounts under the main account in a main account data structure at a server in the data distribution system; instructions to assign a plurality of end user devices to each one of the plurality of sub accounts; and instructions to receive end user device attribute data from at least one of the end user devices to the main account data structure after the attribute data is created at the at least one end user device. In another illustrative embodiment of the medium, the end user device attributes data are stored in the main account data structure and the end user device attributes data further comprise data selected from the group consisting of favorite data and end user PIN data. In another illustrative embodiment of the medium, the computer program further includes but is not limited to instructions to receive main PIN data from one of the end user devices; instructions to access an end user PIN in main account data associated with the one end user device; and instructions to send the end user device PIN to the one end user device for entry in place of the main PIN on the end user device.

In another illustrative embodiment of the medium, the computer program further includes but is not limited to instructions to assign features data to one sub account in the plurality of sub accounts; instructions to assign the feature data from the features data assigned to the one sub account down to the plurality of end user devices assigned to the one sub account; and instructions to send feature data to the plurality of end user devices, wherein the features data assigned to the plurality of end user devices is selected from the set consisting of spending limit data, parental control data and main personal identification code (PIN) data, the computer program further comprising instructions to send the feature data to the plurality of end user devices upon activation of one of the end user devices. In another illustrative embodiment of the medium, the computer program further includes but is not limited to instructions to receive end user activity data from the end user devices assigned to the one sub account; and instructions to store the end user activity data in the one sub account in the main account data structure.

In another illustrative embodiment of the medium, the end user device activity is received at the server in near real time, the computer program further including but not limited to instructions to create a sub account profile for an end user profile in the main account data structure associated with the one sub account. In another illustrative embodiment of the medium, the computer program further includes but is not limited to instructions to send targeted advertising data to the end user devices for the one sub account based on the end user profile for the one sub account. In another illustrative embodiment of the medium, the end user activity data further comprises data selected from the set consisting of data indicating a preferred end user device type, a preferred time of day and a preferred advertising data format. In another illustrative embodiment of the medium, the preferred advertising data format further comprises format data selected from the set consisting of audio data, short messaging service data, instant messaging data, JPEG data and video data.

In another illustrative embodiment, a system is disclosed for managing a plurality of sub accounts under a main account in a data distribution system, the system including but not limited to a server processor in data communication with a computer readable medium; a first processor interface for receiving data indicating the plurality of sub accounts to be assigned under the main account in a main account data structure at the server in the data distribution system; a second processor interface for receiving data from a plurality of end user devices, the data indicating a plurality of end user devices to assign to each one of the plurality of sub accounts; a third processor interface for receiving end user device attribute data from at least one of the end user devices to store in the main account data structure after the attribute data has been created at the at least one end user device; a fourth processor interface to receive main PIN data from one of the plurality of end user devices; a fifth processor interface to access end user PIN data in the main account data associated with the end user device; and a sixth processor interface to send the end user device PIN data to the end user device for entry at the end user device in place of the main PIN data.

In another illustrative embodiment of the system, the system further includes but is not limited to a seventh processor interface to send feature data to the plurality of end user devices, wherein the features data assigned to the plurality of end user devices is selected from the set consisting of spending limit data, parental control data and main personal identification code (PIN) data; and an eighth processor interface to send the feature data to the plurality of end user devices upon activation of one of the end user devices. In another illustrative embodiment of the system, the system further includes but is not limited to a ninth processor interface to receive end user activity data from the end user devices assigned to the one sub account; and a tenth processor interface to store the end user activity data in the one sub account in the main account data structure. In another illustrative embodiment a method for managing a plurality of sub accounts under a main account in a data distribution system, the method including but not limited to assigning the plurality of sub accounts under the main account in a main account data structure at a server in the data distribution system; assigning a plurality of end user devices to each one of the plurality of sub accounts; receiving end user device favorite attribute data from at least one of the end user devices to the main account data structure after the attribute data is created at the at least one end user device; and sending the favorite attribute data to other end user devices under the one sub account.

In another illustrative embodiment of a computer readable storage medium is disclosed, having a computer program stored therein, the computer program including but not limited to machine readable instructions that when executed by a computer send end user device attribute data from an end user device to main account data structure in a server after the attribute data is created at the end user device. In another illustrative embodiment a system is disclosed, the system further includes but is not limited to an end user device processor in data communication with a computer readable medium; a first processor interface for sending to a server, end user device attribute data for storage at the server in a main account data structure after the attribute data has been created at the end user device; a second processor interface to send to the server main PIN data from the end user device; and a third processor interface receive from the server end user device PIN data for entry at the end user device in place of the main PIN. In another illustrative embodiment a method is disclosed, the method including but not limited to sending to a server, end user device favorite attribute data from an end user devices to the main account data structure after the attribute data is created at the at least one end user device for use by other end user devices under the one sub account.

Turning now to FIG. 1, as shown in FIG. 1, a schematic representation depicting a scenario of operation for a particular illustrative embodiment 100 includes but is not limited to a household 102 and family members 104, 106 and 108. In an illustrative embodiment, a main account is issued to the household by a data distribution system and sub accounts assigned under the main account to each of the family members or end users. In an illustrative embodiment, a data distribution system over an IPTV system which provides services such as IPTV, voice over internet protocol (VoIP), high speed internet and wireless connectivity for mobile devices. As shown in FIG. 1, a first family member 104 is a primary or main account end user that is primarily associated with the main account and a set of end user devices such as master bed room television 110, email address 118 and mobile telephone 126. A primary house land line 122 and living room television are associated with the main account for house hold 102. The primary end user is associated with the main account is also assigned a first sub account. A second family member 106 is associated with a second sub account under the main account and a set of end user devices such as bedroom television 114, email address 116 and mobile phone 130. A third family member 108 is associated with a third sub account and end user devices such as a secondary email address 120 and a mobile the telephone 128.

Numerous other end user devices can be associated with each family member and each of the sub accounts. The end user devices are tracked at the sub account level by collecting end user device activity data for each end user device under a sub account. An end user profile is built based on the end user device activity data for the end user and sub account with which the end user devices are associated. A main account user can set features for each sub account which are sent down to end user devices assigned to the sub account. Features set at the main account level and down to the sub account level and end user devices under the sub account can include but are not limited to spending limits, parental control data and main personal identification codes (PINs). A main account data structure at a sever in the IPTV profiling system stores data such as main and sub account features and end user device attributes. The feature data including but not limited to spending limits, parental controls and main account PIN codes and are assigned down to the child sub account in the data structure and to each end user device under the sub account and are stored in the main data structure associated with the child's sub account. In a particular embodiment, each time an end user device is activated the main account, sub account and end user device data is downloaded from the main account data structure at the system server to the end user device memory.

In another embodiment, the attributes data such as end user device PINs and favorite data are reported up from end user devices to server for storage in the main account data structure. The main account, sub account and end user device data including but not limited to main account features and end user device attributes are downloaded periodically to end user devices. The download period is chosen at the convenience of the user, and may be any period, such as daily. In another embodiment the end user device attributes data such as end user device PINs and favorites data are accessed in the system data structure by the end user device upon activation of the end user device. In another embodiment, end user device attributes such as end user device PINs, favorite data and end user device activity are sent to the system server main account data structure from end user devices when the attributes are created at each end user device. In another embodiment, end user device attributes such as end user device PINs, favorite data and end user device activity are sent to the system server main account data structure periodically from end user devices. Because the main account data structure contains all features and attributes data, the features and attributes data can be shared between the main account and sub accounts and between end user devices under a sub account. End user devices under separate sub accounts share main features data at the sub account level.

For example, a feature, such as a spending limit of $50.00 for a child sub account can be set by a parent at the main account level and stored in a main account data structure in a system server data structure. All end user device activity under the child sub account is monitored so that purchases made by cell phone, internet, or any other means associated with any end user device associated with the child's sub account are tracked under the child's sub account and subjected to the $50.00 spending limit at the sub account level. For example purchases of $25.00 on the internet and $15.00 on the cell phone would tracked at the sub account level for a cumulative purchase of amount of $40.00, which is applied to the $50.00 spending limit for child's sub account. Thus an additional purchase request under the child's sub account for a video on demand (VOD) at $12.95 would represent a potential spending of $52.95 and would be denied at the sub account level as this $12.95 purchase would exceed the sub account spending limit of $50.00.

The end device activity data representing purchases and spending limits are reported from the sub account level to the main account level where a main account function monitors and enforces spending activities and spending limits. A main account function monitors all purchases as they are being made and can adjust spending limits when desired. Thus, in the current example, a main account function would receive a notification that the child sub account has requested a VOD exceeding the spending limit and the purchase could be allowed by adjusting the child's sub account spending limit to $52.95 at the main account level, if the VOD is an approved VOD title stored at the main or sub account level. Thus, a spending limit can be overridden with an approved title data that allows a sub account user to exceed the spending limit.

Similarly, a request to access content on the IPTV system from the sub account level that is rated mature (M) would be denied at a sub account level when parental control for the child's sub account has been set at PG-13 by a main account user. The parental control level can be changed to temporarily or superseded (e.g., from PG-13 to M) to allow access to a particular title for a game rated M when the main account user deems the M-rated game allowable for the child's sub account. Likewise, data representing a PIN set at the sub account level can be associated with data representing individual PIN data for each end user device under the sub account so that a sub account level PIN can be associated with an individual end user device PIN for each end user device under a sub account. Thus, a sub account user can enter the sub account pin at an end user device, which accesses an end user device PIN for a sub account entry PIN in the main account data structure and the system server sends the end user PIN to the end user device for entry on the end user device. For example, if a sub account PIN is set at 1234 and an end user device email access PIN is set at "buddy", a sub account user can enter the sub account PIN 1234 at the email account and the email access PIN of "buddy" would be sent from the data structure by the system server and entered at the end user device in place of the sub account PIN to allow email access. Individual PINs for end user devices are reported to the sub account level and associated with the sub account PIN for this purpose. Likewise, in another particular embodiment, sub account PINS are associated main account level PIN data ("main PIN") so that a main PIN data can be entered on an end user device which accesses the sub account PIN data and main PIN for the end user device in the main account data structure at the server. The server sends receives the end user device PIN, identifies the device by a SIM identification code, MAC address or IP addresses or some other identifying data for the end user device. The server accesses the main account data structure and determines a sub account and main account to which the end user device is assigned. The server looks up the end user device PIN from the master account and sends the end user device PIN data to the end user device which is entered on the end user device in place of the main PIN, which allows access to the end user device using the master account PIN data.

In another particular illustrative embodiment, end user device attributes such end user device PINs and data indicating a list of favorites are sent to the server form the end user device upon creation of the attributes data at the end user devices. The attributes data are stored in the main account under a sub account for use on other end user devices. Thus all end user devices under a sub account share the attribute data if designated for sharing, such as favorite data. End user device PINs are not shared between end user devices but can be aliased as discussed above by entering a main PIN or a sub account PIN which is sent to the server from the end user device upon which the server returns the end user device PIN to the end user device for use as a PIN.

For example, in a particular embodiment, a cell phone for a particular sub account has a list of favorite data to which the sub account user places most of their calls. The list of favorites data, for example, "Bill, Mary and Sam" along with cell phone numbers, physical addresses, email addresses, birth dates, pictures and other contact information for Bill, Mary and Sam are created on the end user devices and sent to the system server and stored in the main account data structure in the sub account level where the list of favorite data are also assigned to the sub account user's other end user devices, such as a cell phone. Thus, the same list of favorite data is shared or made available on the sub account user's end user devices such as email at a computer or other mobile end user device and at the sub account user's end user device cell phone. Likewise, a list of favorite from the computer along with cell phone numbers, physical addresses, email addresses, birth dates and other contact information are sent to the server main data structure and assigned to the sub account level and made available for sharing at the cell phone end user device. In an illustrative embodiment, all end user devices under a particular sub account share end user device attribute data which is accessible to the end user devices at the server main account or downloaded to the end user devices from the sever main account to the end user devices.

End user device activity for all end user devices sent to the main data structure as monitored by the system server and assigned in the main account data structure to a sub account, including but not limited to end user device activities such as cell phone and internet purchases, phone calls, and web surfing activity are reported to the sub account level where the end user device activity data are accumulated and used to create an end user profile for end users at the sub account level in the main account data structure. The end user profiles are reported to the main account and subsequently to the IPTV system for use in generating targeted advertising to end users based on the end user profiles. In a particular embodiment end user device activity data includes but is not limited to the type of device (cell phone, email, web surfing, etc.), the format of the data (short messaging service (SMS) data from texting, HTML from web surfing, email data from email activity, audio data such as music for personal media players (PMPs), JPEG data, instant messaging data and video data), and the time of day.

Thus, an end user profile includes but is not limited to receiving end user device activity in real time or periodically for tracking usage on each type of end user device by time of day, end user activity (IM, SMS, web surfing, emailing, etc.) and format of the data (video, audio, HTML, text, JPEG). Based on the time of day, end user activity and format of the data, each end user sub account is then assigned a preferred end user device type, preferred data format and preferred time of day based for the end user at the sub account level. The preferred end user device type, data format and time of day are used to select targeted advertising for end user devices.

Thus, based on an end user profile, it can be determined for each end user sub account, a preferred device type, preferred time of day, preferred data format and preferred end user activity which are most effective for reaching an end user with targeted advertising. For example, based on the end user device activity and end user profile data, it can be determined that a particular end user associated with a sub account uses the cell phone for texting SMS messages primarily between 5-7 PM on Monday-Friday and watches television from 7-10 intermittently over the weekend. Thus the preferred end user device is a cell phone, the preferred data type is text, the preferred activity is texting and the preferred time of day is 5-7 PM. Based on this end user profile data, a targeted advertisement could be directed to the end user in an SMS message on their cell phone between 5-7 PM Monday-Friday using the a preferred device type, preferred time of day, preferred data format and preferred end user activity. Likewise an end user that prefers the computer and mainly downloads audio files from music sites on their computer from 9-11 PM Friday and Saturday night can be sent a targeted advertising audio data advertising message on their computer between 9-11 PM Friday and Saturday night. An alternate audio message can be sent to the same end user on their cell phone during the day asking them to listen to a new music track on their computer. Thus, targeted advertising data can be sent to an end user on different end user devices other than their preferred device, but in the preferred data format. In another embodiment, it can be determined what end user device a user is currently using ("current device") and a targeted advertisement sent to that current device.

In another particular embodiment, variations in the preferred device type, preferred time of day, preferred data format or preferred end user activity can be used for sending targeted advertising. Data formats and end user devices other than preferred data formats and preferred end user devices can be targeted for an end user at times other than the preferred time of day. Sub accounts for a particular household can be grouped together as associated for targeted advertising based on the assumption that family members within a household have influence over each other purchasing decisions based on family interaction such as dinner table conversations.

Figure 2:
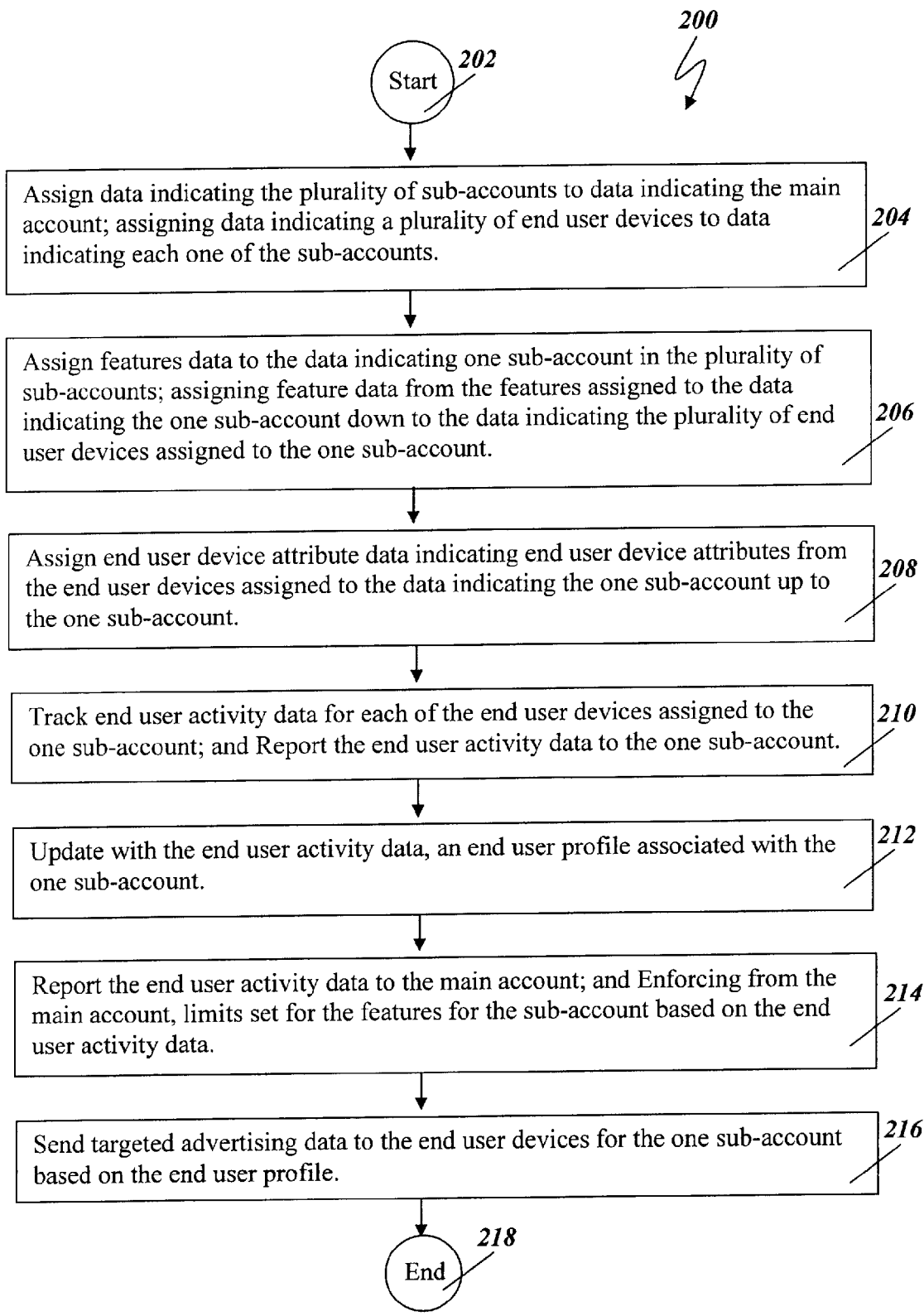
FIG. 2 is a depiction of functions executed in a particular illustrative embodiment.

Turning now to FIG. 2, a flow chart 200 of functions performed in a particular illustrative embodiment is depicted. No order of execution or mandatory functions are implied or dictated by flow chart 200. As shown in flow chart 200, at block 202 an illustrative system, computer program product and method assign data indicating the plurality of sub accounts to data indicating the main account and assign data indicating a plurality of end user devices to data indicating each one of the sub accounts. As shown in block 204 an illustrative system and method further assign features data to the data indicating one sub account in the plurality of sub accounts and assign feature data from the features assigned to the data indicating the one sub account down to the data indicating the plurality of end user devices assigned to the one sub account. As shown in block 206 an illustrative system and method assign end user device attribute data indicating end user device attributes from the end user devices assigned to the data indicating the one sub account up to the one sub account. The end user device attributes data further can include but are not limited to data indicating favorites contact data and end user PIN data.

As shown in block 208 an illustrative system and method track end user activity data for each of the end user devices assigned to the one sub account and reports the end user activity data to the one sub account. As shown in block 210 an illustrative system and method update with the end user activity data, an end user profile associated with the one sub account. As shown in block 212 an illustrative system and method report the end user activity data to the main account; and enforces from the main account, limits set for the features for the sub account based on the end user activity data. As shown in block 214 an illustrative system and method sends targeted advertising data to the end user devices for the one sub account based on the end user profile stored in the main account data structure at the system server. The end user activity data further includes but is not limited to data selected from the set consisting of data indicating a preferred end user device type, a preferred time of day and a preferred advertising data format. The preferred advertising data format further includes but is not limited to format data selected from the set consisting of audio data, short messaging service data, instant messaging data, JPEG data and video data.

Figure 3:
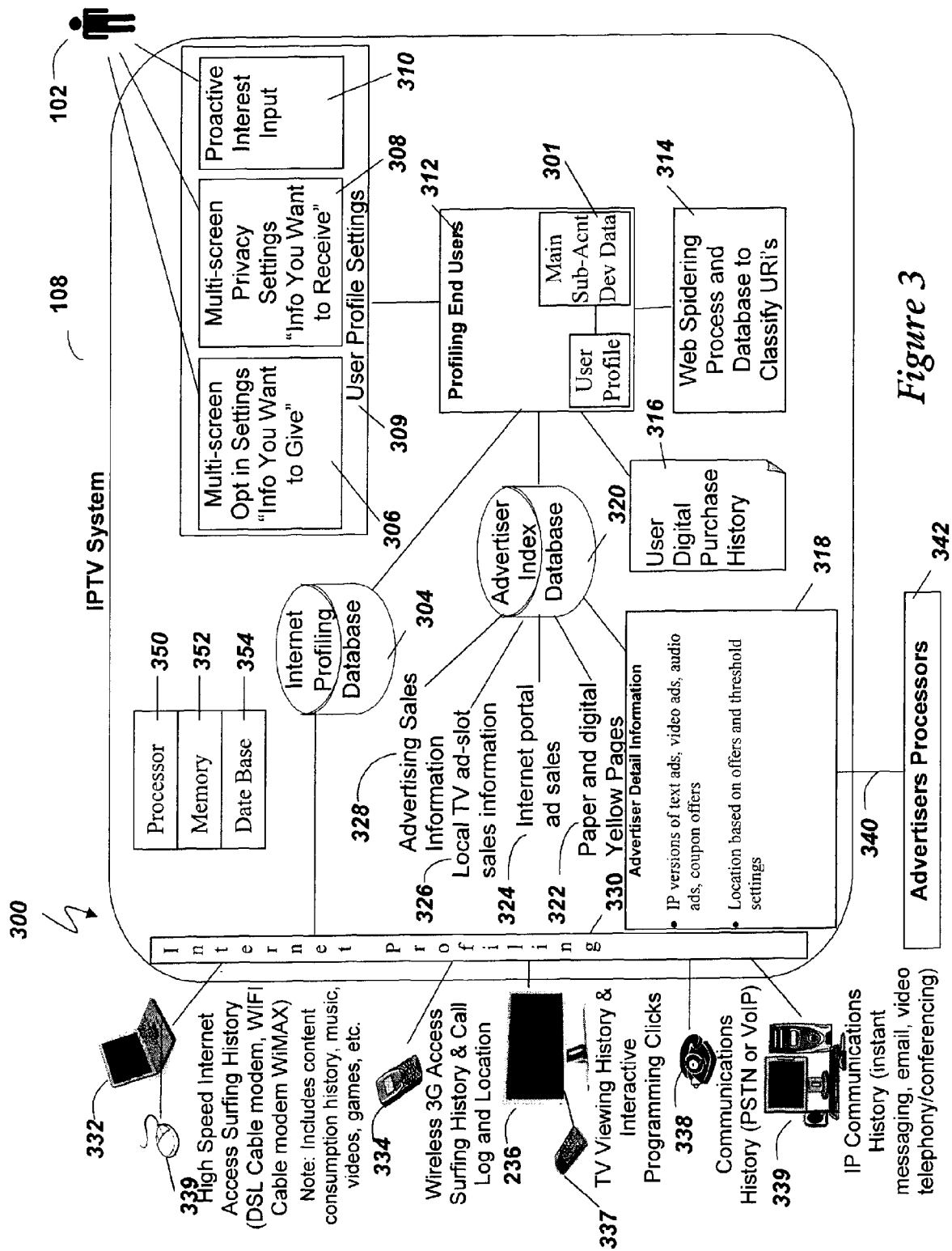
FIG. 3 is a schematic diagram of a user profiling system for sub account end user devices in an illustrative embodiment.

Turning now to FIG. 3, an internet protocol television (IPTV) profiling system receives and monitors end user device activity and stores main account, sub account and end user device data in a main account data structure. The main account data is exchanged interactively with the end user devices as described herein. Today consumers are now provided increasingly more choices in high speed internet protocol Internet access networks. Moreover, consumption of television services and Internet content will be increasing over new delivery systems such as IPTV platforms, digital subscriber line (DSL), fiber optic, and cable broadband networks, municipal wireless networks, and third generation (3G) mobile networks. Subscriber access devices used to access these networks can be used to deliver targeted advertising to subscribers. In illustrative embodiment provides targeted advertisements to subscribers using modalities including but not limited to TV commercials, banner advertisements in web browsers, multimedia IP based advertisements via web browser plug-ins such as flash, instant messaging, multimedia messaging service (MMS) and short messaging service (SMS) messages sent to a cellular telephones. An illustrative embodiment also provides pricing, modality and scheduling options to advertisers.

In an illustrative embodiment an IPTV system server send pictures, movie clips, cartoons and other graphic materials to cell phones. Using SMS, an illustrative embodiment can send and receive short alphanumeric messages to and from mobile telephones. An illustrative embodiment can also send video, audio, emails and text data over any communication network to which it has access including but not limited to an IPTV network, public switched telephone network (PSTN), VoIP network, wireless network, WiFi and/or WiMAX network which now exists or may be created in the future that can be used to send data to a subscriber access device.

In an exemplary scenario, while doing his homework, Sean, a high school student has tuned in to a hip hop Internet radio channel from his laptop computer. Sean's product interest score for targeted advertising is thus increased in the product category, "rap music". Later on in the evening, when he turns on his cell phone to chat with a friend, he receives a targeted text message advertisement for a ring tone of a rap artist's latest track. Always known to walk around with the latest ring tone on his cell phone, Sean has opted in to receive advertisements regarding ring tones for his mobile device. Now he only has to push a few buttons in order to purchase this ring tone content via his eWallet and download the ring tone to his mobile device without having to search for the ring tone on the Internet. Thus, Sean saves time and effort and the advertisers' targeted advertising effort has been successful. (eWallet, also referred to as digital wallet, is an application or service that assists consumers in conducting online transactions by allowing them to store billing, shipping, payment, and preference information and to use this information to automatically complete merchant forms.

This greatly simplifies the check-out process and minimizes the need for a consumer to think about and complete a merchant's form every time. eWallets that fill forms have been successfully built into browsers, as proxy servers, as helper applications to browsers, as stand-alone applications, as browser plug-ins (including for example, an Internet search engine toolbar), and as server-based applications. The most likely future eWallet for consumers will be built-in right into their web-enabled cellular telephone.)

FIG. 3 depicts a block diagram 300 depicting informational components that are used by and integrated into the IPTV system in an illustrative embodiment. In a particular illustrative embodiment, a system, computer program product and method aggregate, collate and mine surfing and content (music, television, movies, audio books, etc.) consumption data across multiple access devices and network access devices and mechanisms (e.g., including but not limited to, IPTV, wireless 3G, high speed Internet access), coordinating the information tightly with subscriber opt-in preferences, to create a highly targeted and contextualized advertising system for subscribers of IP-based services (including but not limited to, IPTV, VoIP, email, SMS, mobile calling, web surfing, instant messaging (IM), chatting, blogging, and mobile computing, etc.).

As shown in FIG. 3, in an illustrative embodiment, an IPTV system 108 includes but is not limited to an internet profiling process 330 that receives, processes and monitors end user devices activity data (also referred to herein as end user device and subscriber activity data) used to access the IP network and stores the access event devices data in an Internet profiling database 304. The IPTV system includes processor 350, computer readable media memory 352 and data base 354. The end user devices include but are not limited to telephones 338 calling via a public switched telephone network (PSTN) or connected over a VoIP network, remote controls for television viewing selections and interactive programming clicks or menu selections 336, cell phones 334 using 3G access for accessing the Internet and calling and personal computers/lap top computers and other IP devices 332 using high speed Internet access for web browsing, SMS, IM, email, chatting, text messaging, etc. Location information 335 obtained during the subscribers' use of mobile and/or portable Internet devices is also provided to the Internet profiling process 330. Given that a subscriber at an end user device has "opted in" to allow being monitored for some or all of the information available through the Internet profiling process 330, the Internet profiling process 330 monitors the end user devices activity data associated for the subscriber's communications including outgoing calls, telephone numbers called, Internet access surfing history, content consumption, music, videos and games, IM, text messaging, chatting, and locations of a subscriber, etc. The Internet profiling process may monitor digital or analog electronic activity of the subscriber to store in the subscriber profile 309 and calculate a product interest score in a product or service category for the subscriber based on the monitored event data.

An advertiser index database 320 stores data indicating advertising sales information 328, local television ad-slot sales information 326, Internet portal advertising sales 324, paper and digital yellow pages sales and advertiser detail information 318. The ad-slot sales information may include times in which available advertising spots are available and in what medium, for example IPTV, IP radio, etc. The advertiser detail information 318 includes but is not limited to IP versions of text advertisements data, video advertisements, audio advertisements and coupon offers. Audio advertisements can be sent to subscriber cell phones or mobile IP devices as recorded messages and video, audio, text and email advertisements can be sent to subscriber cell phones, PDAs, lap top computers and other mobile digital devices capable of receiving data.

The subscriber may also have the option of completing the purchase digitally using the eWallet subject to spending limits set at the sub account level by the main account, so the item is ready for pick-up at the retail outlet when they arrive. In such an instance the subscriber's user eWallet and digital purchase history 316 in the user profile would be updated accordingly. The digital purchase history in the user profile data includes but is not limited to eWallet purchases, subscriber purchases reported by merchants or monitored by the Internet profiling process and purchase information imported from another network. The end user profiles are stored in the main account data structure for each sub account.

Advertiser processors 342 may send and receive data to and from and interact with the advertiser detail information data 318 via interface 340. Interface 340 which may be any digital or electrical interface for sending and receiving messages and data between an advertiser processor 342 and the advertiser detail information 318 data storage. The advertiser index database 320 is in communication with the targeted advertising system 312. The targeted advertising system also communicates with the Internet profiling database 304, a user digital purchase history 316, and a web spidering process that classifies URIs 314, subscriber intent and user (subscriber) settings. In an illustrative embodiment the web spidering process visits each URI visited by a subscriber and assesses the subscriber's intent in visiting the URI. Web spidering, otherwise known as web crawling, browses the World Wide Web in a recursive, automated manner by starting with a list of URIs to visit, and then checking for hyperlinks at each URI and visiting those also. In an illustrative embodiment, the web spidering process 314 parses the text on each web page visited by a subscriber and infers product category interest intent for a subscriber visiting the web page for one or more product categories.

In an alternative embodiment, instead or in addition to the web spidering system, a web proxy may be introduced between the subscriber access device and a server to monitor and capture, URIs and URI data accessed by any one of the subscriber access devices used by the subscriber. A processor within the proxy or connected to the proxy will use this data to classify and categorize online events. Such URI data may include responses from the URI to the subscriber including but not limited to purchase transactions, content including video, audio and text and messaging interactions. The URIs and URI data is cached, stored and classified/categorized and indexed with Meta data added by the spidering system or proxy.

The user profile setting includes but is not limited to user profile data and end user profile settings 306, 308 and 310. User profile data includes but is not limited to ages, family size, ethnicity, language spoken, address, subscriber user identifiers for family members, etc. User profile settings may also include but are not limited to multiple screens or device opt-in settings for selecting access devices through which a subscriber 101 is willing to allow advertising to be received 308. User profile settings may also include privacy (opt-in) settings defining specifically what categories of advertising may be received, and in what format 308. End user profiles may also include proactive product interest score input 310 provided by a subscriber. The web spidering process described herein is for example only and not intended to limit the scope of the disclosure as a number of different spidering or assessment techniques can be utilized as well as a number of different methods for assessing a subscriber's intent by analyzing and assessing a subscriber's web surfing URIs visited, telephone numbers called, IM and other activities, all of which are included herein under the term "spidering".

Advertisers can place advertisements in multiple media and formats, including text only, audio, HTML, and video that can be rendered to multiple access devices used by the subscriber as appropriate. Several criteria are used to determine advertisement placement or delivery and delivery timing for subscribers. The criteria for determining advertisement placement or selection and delivery to a subscriber can include but are not limited to location data, product interest score data, current usage scenario (e.g., watching an IPTV show, listening to internet radio, playing a game, driving near a product advertiser physical location), a preferred device type, preferred time of day, preferred data format and preferred end user activity and preferred time of day. For example, an advertiser may place an auction bid for a price to send a text message advertisement to cell phones to reach the first 3000 14-18 year old boys between 5 and 9 pm on weekends who are within 5 miles of a shopping mall location having a product interest score for a particular video game exceeding a product interest score threshold of 50.

Subscriber-defined product and service interests along with privacy settings enable subscribers to control what information they are willing to have monitored and used by the system 108 for targeting advertisements to them, and what information they are willing to receive (e.g., on which access devices, from which advertiser product interest score categories, at what times). The main account data structure 301 is stored in computer readable media at the IPTV system and is accessible by the processor 350. Digital purchase history 316 plus brick and mortar purchases bought with electronic wallet (eWallet) credentials help corroborate additional product interest score information on behalf of the subscriber by tracking purchase data for the subscriber. Subscriber digital purchase history information keeps track of on-line purchases and purchases at retail outlets when an associated electronic wallet capability is used (eWallet). Subscriber location is based on wireless networks (WiFi, WiMAX) or the fact the subscriber is located at home using high-speed Internet access assists advertisers in determining how receptive the subscriber might be to their advertisement/product at that time.

The illustrative embodiment the IPTV system 108 aggregates data from multiple sources to provide a centralized storage for IPTV system 108 regarding determining the appropriate advertisements to target a subscriber at a specific time. The illustrative embodiment the IPTV system 108 includes the profiling module 312. Inputs to the profiling module 312 include end user activity data which includes but is not limited to an Internet profiling database 304 which supplies the surfing and content consumption history for the subscriber across multiple access devices; an advertiser index database 320 which maintains substantially all advertising related information including what advertisements have been sold, along with digital versions of various IP-based advertisements; a purchase history 316 for the subscriber that includes purchases made electronically online, plus and brick and mortar retail purchases that may be able to be tracked to the subscriber via the subscriber using the electronic wallet (eWallet) that are tied to his sub account; subscriber profile settings 309 that provide the subscriber the chance to define privacy settings by opt ins or by other privacy control settings on their internet browser, for example, with regard to what types of advertisements the subscriber wants to receive, plus how much of the subscriber's usage history can be monitored and used to drive the targeted advertising process; and a web spidering process 312 that provides more definitive information on what specific URI links within web sites convey about the surfing and purchase history for the subscriber. Subscriber profile settings can be used to define product interest scores, how much on-line usage information can be shared and with whom, and under what conditions a subscriber wishes to receive an advertisement.

An advertiser index database is provided that assimilates, accesses, and stores data for advertising sales records including available slots (spots) for television advertisements, Internet advertisements, radio (audio) advertisements, and paper and digital yellow pages advertisements. The advertiser index database also stores information and data on registered advertisers and their advertisements including product category, various media versions of advertisements, auction prices for each media mode of delivery (audio, video, text), each access device type, coupon offers, location based offers, and product interest score threshold settings that define the conditions for which specific advertisements should be delivered to a specific subscriber having a certain product interest score.

The illustrative embodiment system provides targeted advertising using multiple media types (e.g., video, HTML and associated browser plug-ins like flash, audio, text). Subscribers can input product interest score criteria including product or service category, advertisement delivery scheduling deadline, and desired delivery access device (e.g., cell phone, PC, IP-based television service, mobile IP device). An interactive and/or dynamic web based interface (e.g., XML) to advertisers is provided to enable advertisers to dynamically in real time update advertising offers, auction prices, and threshold settings data for determining when an advertisement in a given product category should be delivered to a particular subscriber. This data is stored in the advertiser detail information 318.

The end user profile is updated dynamically for each end user sub account in real time by the system 312, the spidering process 314 can occasionally be run as a supporting process, scanning the Internet (similar to search engine engines) and classifying web links based on implied intent of subscribers visiting the page. Rather than indexing for search, in an illustrative embodiment the spidering process provides the system with categorization information. In an illustrative embodiment, the components and processes defined herein as part of the illustrative system 108 are intended for processing in real time as events occur. The associated modules that support the targeted advertising system 108 provides messaging to the targeted advertising module 312 interactively (e.g. via XML or a web services framework) so a product interest score in an end user profile can be updated for the subscriber in real time.

A significant amount of information for each end user or subscriber is obtained by the Internet profiling process 330 that is capable of receiving end use activity data indicating subscriber surfing history from independent network service providers, including wireless 3G cellular, DSL, cable modem, broadband fiber, and IPTV. In an illustrative embodiment the Internet profiling process 330 employs a media controller that is capable of logging URIs visited within a subscriber's web browser, and/or performing deep packet inspection (DPI) when desired to ascertain specific content and/or services that are being consumed by a subscriber over the Internet, and assesses packet flows to the subscriber to gauge more specifically what types of activities are being performed (e.g., services of interest, specific services/applications run, duration, location, etc.).

Regardless of access network and device used, the profiling process 330 usually will be able to identify the subscriber via sub account and main account PINs, and then maintains a URI history log for the identified subscriber. The Internet profiling process 330 would typically reside in the IP network, specifically in the routing framework providing Internet access. The routing framework provides a centralized point to monitor and profile subscriber surfing history, traffic characteristics, port usage, etc. with which to monitor activities by the subscriber. This information would only be used based on positive privacy allowance or opt-in settings 306 defined by the subscriber allowing specific monitoring permissions. It is likely that profile subscriber history data information may be obtained from disparate access networks, even those operated by independent network service providers, which may be combined to make a "complete view" (stored in a user profile) of subscriber usage history across multiple access devices and networks plausible. The internet profiling process 330 also includes the ability to accept data feeds (e.g. in XML or other suitable data format) from other network providers that summarize the subscriber historical usage and Internet surfing information data obtained from profiling processes within their own independent network.

Figure 4:
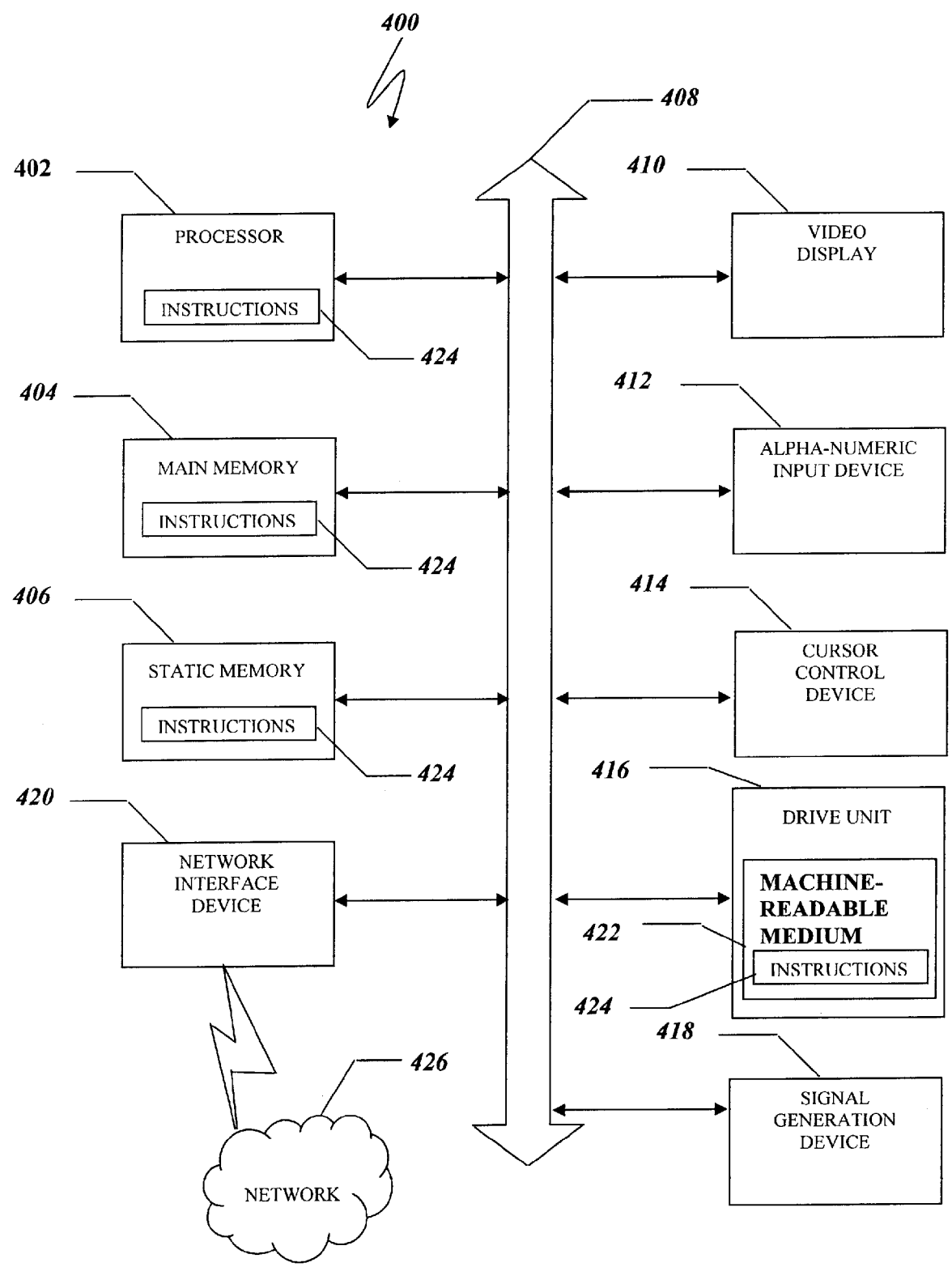
FIG. 4 is a diagrammatic representation of a machine in the form of a computer system within which a set of instructions, when executed, may cause the machine to perform any one or more of the methodologies of the illustrative embodiment.

Turning now to FIG. 4, FIG. 4 is a diagrammatic representation of a machine in the form of a computer system 400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., liquid crystals display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated in herein above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A non-transitory computer readable storage medium, having a computer program stored therein, the computer program comprising machine readable instructions that when executed by a computer manage a plurality of sub accounts under a main account in a data distribution system, the computer program comprising:
instructions to assign the plurality of sub accounts under the main account in a main account data structure at a server in the data distribution system, wherein each one of the plurality of subaccounts is assigned to a particular one of a plurality of end users;
instructions to assign a plurality of end user devices used by the particular one of the plurality of end users to the one of the plurality of sub accounts assigned to the particular one of the plurality of end users, wherein the plurality of end user devices assigned to the sub account share features assigned to the particular one of the plurality of end users at a sub account level;
instructions to receive end user device attribute data from at least one of the end user devices to the main account data structure after the attribute data is created at the at least one end user device;
instructions to determine a preferred end user device type, preferred data format and preferred time of day for the particular one of the plurality of end users; and
instructions to send advertising data to the particular one of the plurality of end users on the preferred end user device type, in the preferred data format at the preferred time of day.

2. The medium of claim 1, wherein the end user device attributes data are stored in the main account data structure and the end user device attributes data further comprise data selected from the group consisting of favorite data and end user PIN data, the computer program further comprising:
tracking end user device activity for each type of end user device assigned to the sub-account by time of day, type of end user activity and data format to determine a preferred end user device type, preferred data format and preferred time of day.

3. The medium of claim 2, the computer program further comprising instructions to receive main PIN data from one of the end user devices; instructions to access an end user PIN in main account data associated with the one end user device;
instructions to send the end user device PIN to the one end user device for entry in place of the main PIN on the end user device; and
instructions to send targeted advertising to the end user device type, in the preferred data format at the preferred time of day.

4. The medium of claim 1, the computer program further comprising:
instructions to assign features data to one sub account in the plurality of sub accounts; instructions to assign the feature data from the features data assigned to the one sub account down to the plurality of end user devices assigned to the one sub account; and instructions to send feature data to the plurality of end user devices, wherein the features data assigned to the plurality of end user devices is selected from the set consisting of spending limit data, parental control data and main personal identification code (PIN) data, the computer program further comprising instructions to send the feature data to the plurality of end user devices upon activation of one of the end user devices.

5. The medium of claim 1, the computer program further comprising instructions to
receive end user activity data from the end user devices assigned to the one sub account; and instructions to store the end user activity data in the one sub account in the main account data structure.

6. The medium of claim 5, wherein the end user device activity is received at the server in near real time, the computer program further comprising instructions to
create a sub account profile for an end user profile in the main account data structure associated with the one sub account.

7. The medium of claim 6, the computer program further comprising instructions to
send targeted advertising data to the end user devices for the one sub account based on the end user profile for the one sub account.

8. The medium of claim 7, wherein the end user activity data further comprises data selected from the set consisting of data indicating a preferred end user device type, a preferred time of day and a preferred advertising data format.

9. The medium of claim 8, wherein the preferred advertising data format further comprises format data selected from the set consisting of audio data, short messaging service data, instant messaging data, JPEG data and video data.

10. A system for managing a plurality of sub accounts under a main account in a data distribution system, the system comprising:

a first processor interface for assigning each one of the plurality of sub accounts under the main account to a particular one of a plurality of end users;

a second processor interface for assigning a plurality of end user devices to each one of the plurality of sub accounts, wherein end user devices assigned to the sub account share features at a sub account level;

a third processor interface for receiving end user device attribute data from at least one of the end user devices to store in the main account data structure after the attribute data has been created at the at least one end user device;

a fourth processor interface to receive main PIN data from one of the plurality of end user devices;

a fifth processor interface to access end user PIN data in the main account data associated with the end user device;

a sixth processor interface to send the end user device PIN data to the end user device for entry at the end user device in place of the main PIN; and a seventh processor interface to track end user device activity for each type of end user device assigned to the sub-account by time of day, type of end user activity and data format to determine a preferred end user device type, preferred data format and preferred time of day and send targeted advertising to the end user device type, in the preferred data format at the preferred time of day.

11. The system of claim 10, the system further comprising:
an eighth processor interface to send feature data to the plurality of end user devices, wherein the features data assigned to the plurality of end user devices is selected from the set consisting of spending limit data, parental control data and main personal identification code (PIN) data; and a ninth processor interface to send the feature data to the plurality of end user devices upon activation of one of the end user devices and send targeted advertising to the end user device type, in the preferred data format at the preferred time of day.

12. The system of claim 11, the system further comprising:
a tenth processor interface to receive end user activity data from the end user devices assigned to the one sub account; and an eleventh processor interface to store the end user activity data in the one sub account in the main account data structure.

* * * * *